Nov. 13, 1945.  W. C. HOUSE  2,388,692
LIFTING TRUCK
Filed Nov. 2, 1943  4 Sheets-Sheet 1

INVENTOR
WILLIAM C. HOUSE.
BY
ATTORNEY

Nov. 13, 1945.  W. C. HOUSE  2,388,692
LIFTING TRUCK
Filed Nov. 2, 1943  4 Sheets-Sheet 2
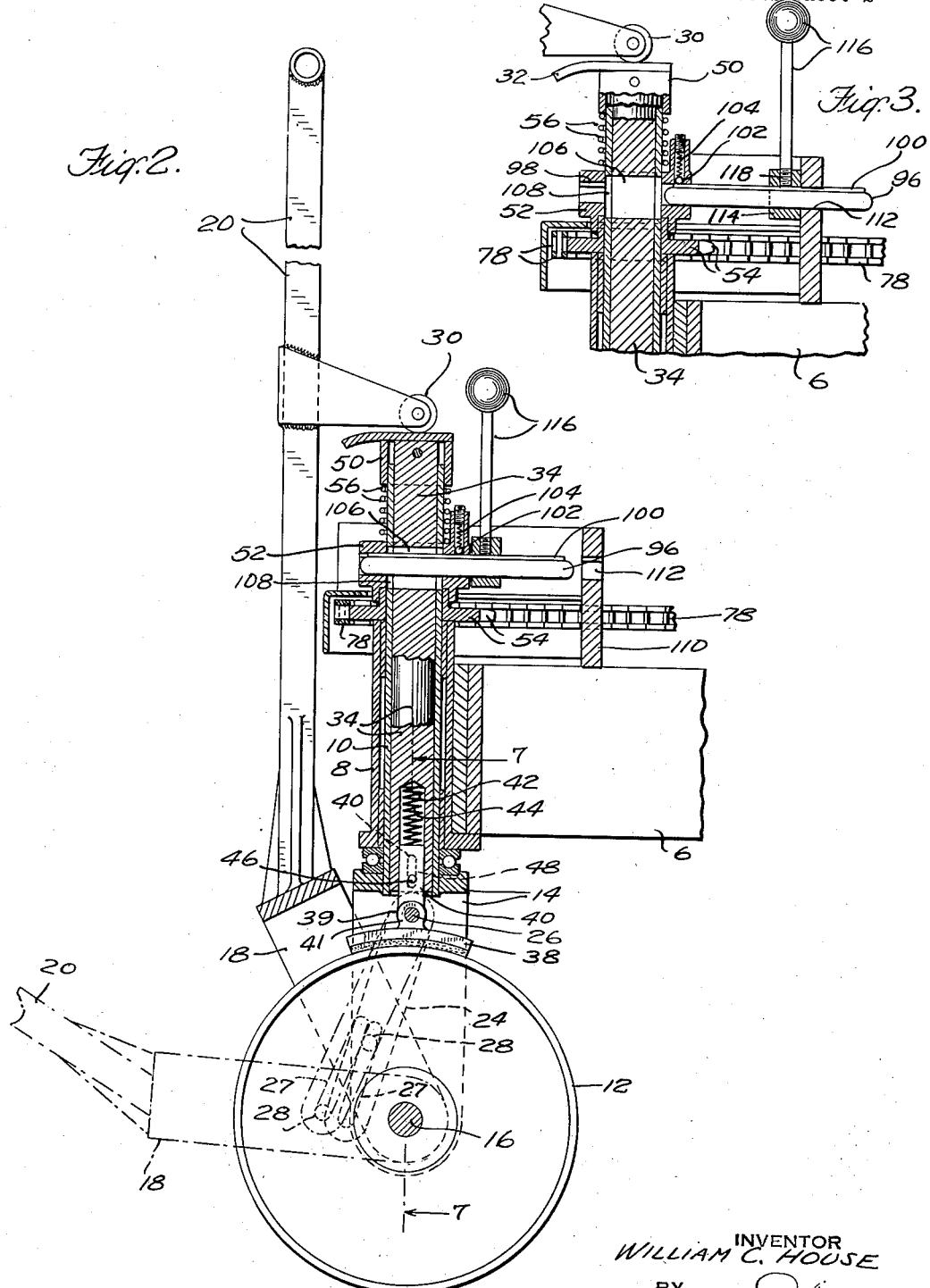
INVENTOR
WILLIAM C. HOUSE
BY
ATTORNEY Nov. 13, 1945.   W. C. HOUSE   2,388,692
LIFTING TRUCK
Filed Nov. 2, 1943   4 Sheets-Sheet 4
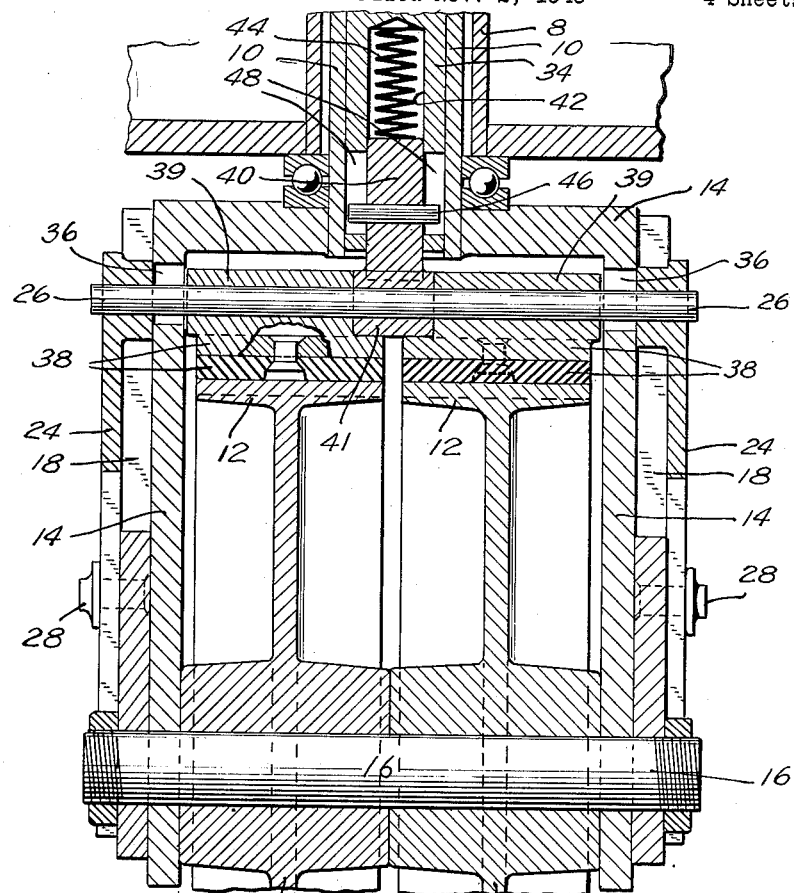
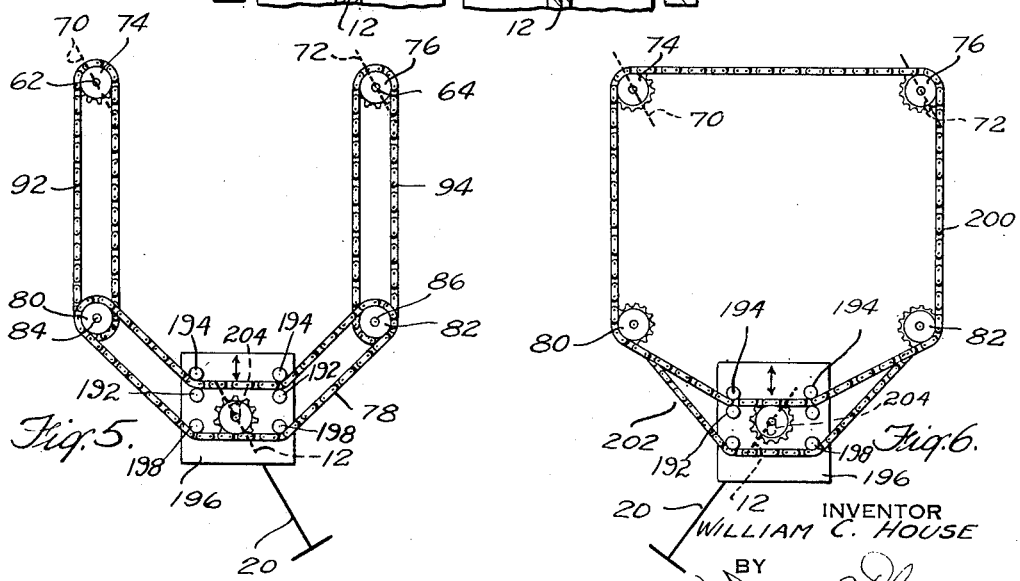
INVENTOR
WILLIAM C. HOUSE
BY
ATTORNEY Patented Nov. 13, 1945

2,388,692

UNITED STATES PATENT OFFICE 2,388,692

LIFTING TRUCK

William C. House, Greene, N. Y., assignor to Lyon-Raymond Corporation, Greene, N. Y., a corporation of New York Application November 2, 1943, Serial No. 508,711

12 Claims. (Cl. 280—48)

This invention relates to manually steered and controlled trucks for handling materials, and particularly to improvements in such trucks designed to facilitate the manipulation thereof in cramped or crowded storage or other spaces. Although the invention is herein shown as embodied in trucks of the type which are designed for jockeying airplanes about aircraft carrier decks or hangar floors and also for moving airplanes about the plants in which they are built, equipped or repaired, such trucks being commonly known as "spotting dollies," it will be understood that the invention has wide application in the material handling art and is not intended to be restricted to the particular application and use herein shown and described.

In order that the storage decks of aircraft carriers or the floors of hangars may accommodate as many airplanes as possible and yet have them quickly available, it is important, both in moving the airplane into storage position and in moving it out of such position for use, that provision be made for performing both of these operations as quickly and easily as possible. Various types of spotting dollies have been designed for this purpose, most of which have been of the caster type. The objection to any material handling equipment of the caster type is that, if there be any unevenness in the carrier deck, or in the hangar, factory or other floor, and particularly if there be slight ridges or grooves, one or more of the casters will almost invariably be forced by the ridges or grooves to veer away from the desired direction of movement and thus increase both the labor and the time required to effect the movement of the airplane or other material being handled either into or out of its desired location. When it is attempted to substitute for the caster type of dolly the ordinary manually steered and controlled truck, difficulty is experienced frequently in obtaining the desired airplane or other material movement because of the necessity, by reason of the front wheel steering, for moving the truck through a substantial arc of movement to bring it into the desired location.

Although airplane spotting dollies are usually used in pairs, each dolly handling one of the two main wheels of the landing gear of the airplane, thus enabling one dolly to compensate somewhat for the necessarily arcuate path of travel of the other dolly in the movement of the airplane into or out of its "spotted" position when the front wheel steered type of dolly is used, there are necessarily waste movements and increased labor required to effect the desired spotting of the airplane either with a caster dolly or with the ordinary front wheel steered truck. As above suggested, these waste movements and the increased labor, in the case of the caster dolly, are due to the irregularity of the travel of such dolly and the resistance it gives to direct movement of the plane into the desired location. In the case of the ordinary front wheel steered truck, the waste movements are due to the increased travel of the truck required by reason of its arcuate path of travel for any turning of the steering wheel out of parallelism with the supporting wheels.

An object of the present invention is to provide a manually steered and controlled truck, particularly a truck of the lift truck type which is readily adaptable for use as an airplane spotting dolly and in which are combined, in a single truck, all of the best features of the ordinary front wheel steered lift truck together with provision, when desired, for synchronous steering of all of the wheels to provide for straight line movements in any direction into and out of the desired storage spot or other temporary location for the airplane or other material to be handled. To this end the present invention aims to provide a manually steered and controlled lift truck which not only can be steered by the front steering wheel or wheels only but in which there is provision, whenever it it desired to bring about steering movements of the rear supporting wheels synchronous with those of the front steering wheel, for effecting positive swivel turning connection between the front wheel steering mechanism and the swiveled supports for the rear wheels to cause the rear wheels to be steered positively in synchronism with the front steering wheel and, preferably, in constant parallelism thereto.

An important feature of the invention is the provision of means to prevent the steering connection to the rear wheels from being made except when the front steering wheels and the rear wheels are in parallelism. A further important feature of the invention is the provision of means for locking the rear wheels against steering or caster movement when it is desired to steer only with the front wheel and to insure that they can be locked against steering movement only when they are in symmetrical relation to the front wheel steering swivel. In other words, the invention contemplates both means for locking the rear wheel steering swivels against swivel movement, but with the rear wheels in symmetrical relation to the front wheel steering swivel, when the synchronous steering connections to said rear wheels are not operative, and also means for preventing the disconnection of said synchronous steering connections and the locking of the rear wheels against any caster movement except when they are in a position of parallel symmetry in respect to the front wheel swivel.

Other objects and important features of the invention will appear hereinafter when the following description and claims are considered in connection with the accompanying drawings, in which—

Figure 1 is a perspective view looking from the front of a lift truck embodying the present invention, the illustrated truck being designed particularly for use as a spotting dolly for airplanes;

Figure 2 is a section through the steering head of the truck shown in Figure 1, illustrating the details of the brake and brake-operating mechanism and of the means for effecting the connection of the rear supporting wheels to the front steering wheels for synchronous steering, this view showing the driving sprocket for the synchronous steering in its connected relation to the front steering wheel swivel stem;

Figure 3 is a detail section similar to Figure 2 but showing the driving sprocket in its disconnected relation to the front wheel swivel stem but locked against movement in order to lock the rear wheel swivel stems against caster movement;

Figure 5 shows a modification by which the synchronous steering connections can be so made as to facilitate turning about sharp corners;

Figure 6 shows another modification for the same purpose as Figure 5 but utilizing a single sprocket chain for connecting the swivels, and Figure 7 is a section on the line 7—7 of Figure 2.

Figure 1:
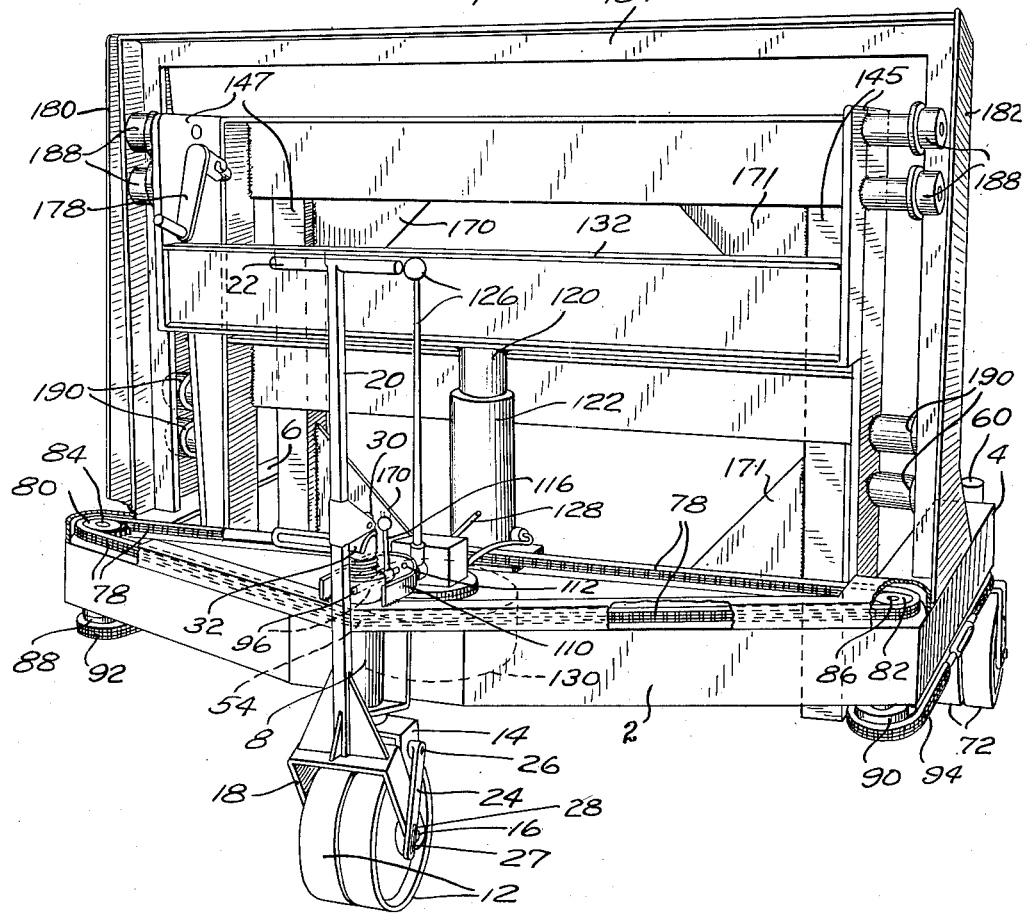
Figure 4:
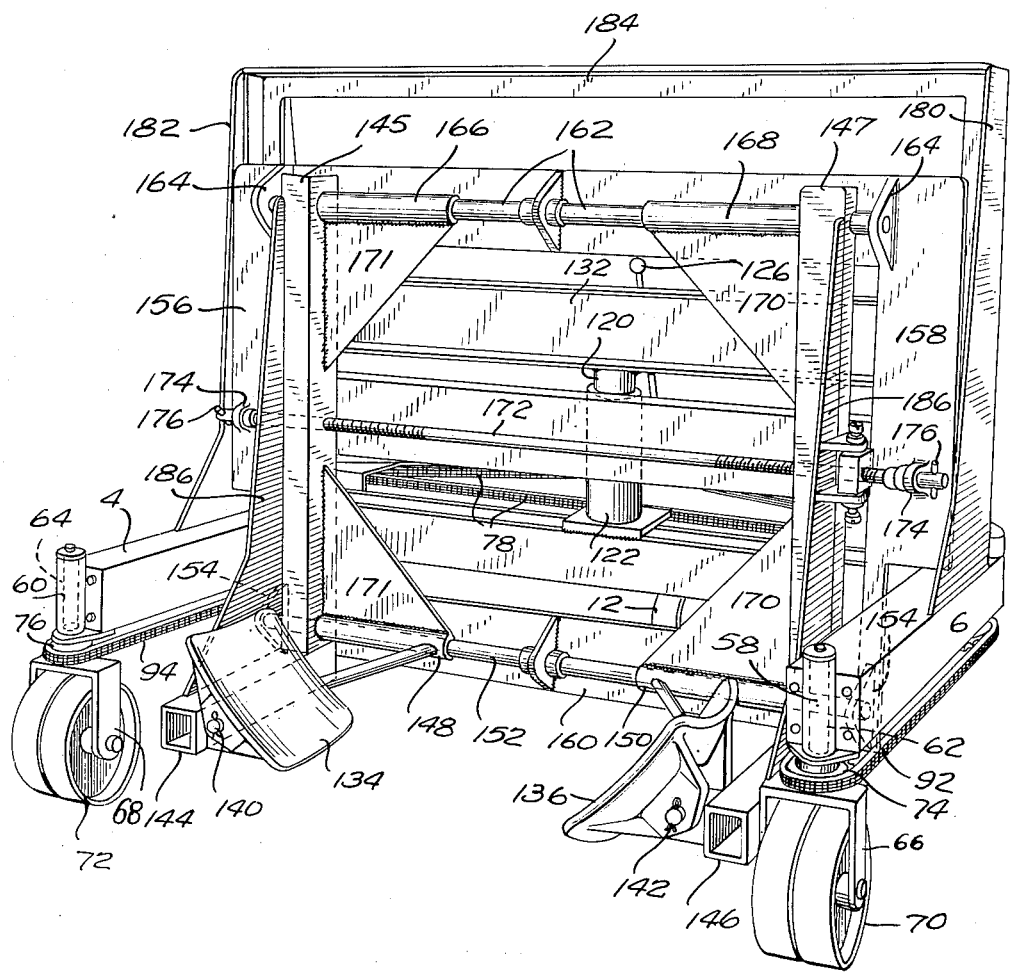
Figure 4 is a perspective view of the truck shown in Figure 1 but looking from the rear.

In the illustrative embodiment of the invention the truck frame or body proper has an open rear end and comprises the front body portion 2 and spaced side members 4 and 6 which may be formed of steel of rectangular open section as shown. Attached to the front part of the truck body in mid-position is a vertical bearing 8 for the swivel stem 10 of the front wheel bearing support, this stem preferably being hollow for a purpose hereinafter described. As herein shown the bearing support for the front steering wheels 12 comprises a fork 14 welded or otherwise suitably connected to the stem 10 and receiving the bearing pin or shaft 16 for the wheels 12, this shaft preferably extending sufficiently beyond the sides of the fork 14 to receive a second fork 18 by which the combined draft and steering tongue 20, provided with the handle bar 22, is connected to the steering wheels 12. The steering fork 18 is connected by links 24 to a brake carrying shaft 26 extending across the fork 14 above the wheels 12 and projecting through the sides of the fork. Each link 24 has therein a slot 27 in which is received the shank of a headed pin 28 on a side arm of the fork 18. This slot 27 permits vertical swinging movement of the steering handle 20 but its closed lower end, by engaging the pin 28, limits the initial downward movement of the handle. The slot 27 is preferably of sufficient length so that, when the tongue 20 is moved to its upright position, its cam-engaging roll 30 can be brought into operative brake-applying relation to the cam 32 on the upper end of a brake-applying rod 34 which is movable vertically to a limited extent in the hollow center of the swivel stem 10.

As herein shown, provision is made for applying the brake to the front steering wheels both when the combined draft and steering tongue 20 is in its upright position and when it is in its lowermost position. The application of the brake in the last mentioned position is made possible by providing slots 36 in the side arms of the fork 14 in which the brake carrying shaft 26 may have a vertical brake-applying movement after the pins 28 on the fork 18 have reached the lower ends of the slots 27 in the links 24. As herein shown, brake shoes 38 for the respective wheels 12 have ears 39 by which they are pivoted on the cross pin or shaft 26 and this cross shaft 26 is in turn carried by a tubular support 41 welded to the lower end of a plunger 40 arranged to move vertically in a socket 42 in the brake-applying rod 34. A compression spring 44 tends to hold the plunger 40 yieldingly at the lower limit of its movement in the socket 42, this movement being limited by pin 46 carried by the plunger 40 and operating in slots 48 in the side wall of the socket 42.

It will be seen from an inspection of Figure 2 that a cap 50, having formed thereon the cam 32, is connected to the upper end of the brake-applying rod 34 and that this cap is of sufficient diameter so that it can telescope over the upper end of the hollow swivel stem 10. Between the lower edge of the cap 50 and the upper end of a sleeve 52, which carries the driving sprocket 54, hereinafter more fully to be described and which, in turn, rests upon the upper edge of the swivel stem bearing 8, is a spring 56 which is so tensioned that it tends to maintain the brake-applying rod 34 in brake-releasing position.

It will thus be seen that when the steering handle is in the upright position shown in the full lines in Figure 2 of the drawings the brake will be applied by the engagement of the cam roll 30 on the tongue 20 with the cam 32 on the upper end of the brake-applying rod 34, which thus tends to depress the brake-applying rod sufficiently to bring the brake shoes 38 into engagement with the steering wheels 12. This application of the brake shoes will be spring pressed since the spring 44 and plunger 40 intervene between the brake-applying rod 34 and the brake. The compression of the spring 44 causes the pin 46 to travel up the slots 48 in the walls of the socket 42 after the brake shoes 38 have engaged the wheels 12, this compression increasing the braking effect.

When the combined draft and steering tongue 20 is in the dotted line position shown in Figure 2, that is, when it has been depressed approximately to the lowest limit of its movement, the brake can then be applied through the engagement of the pins 28 with the lower ends of the slots 27 in the links 24 which will cause the links 24 to pull down on the cross pin 26 carrying the brake shoes 38, against the tension of the spring 56, exerted through pin 46 engaging the bottoms of slots 48 in the side wall of socket 42 in rod 34, and thus bring the brake shoes 38 positively into braking engagement with the steering wheels 12. Preferably the combined weight of the tongue 20 and the handle bar 22 is such in respect to the tension of the spring 56 that a mere dropping of the tongue 20 by the operator will produce an effective application of the brake.

At the rear ends of the side arms 4 and 6 there are connected to the truck body bearings 58 and 60 for swivel stems 62 and 64 of the bearing supports 66 and 68 of the rear supporting wheels 70 and 72 of the truck. These swivel stems 62 and 64 for the rear wheel bearing supports 66 and 68, mounted in the swivel bearings 58 and 60, instead of serving merely to permit the rear wheels 70 and 72 to caster, are so connected to the driving sprocket 54 that at no time can these wheels caster freely. In accordance with the present invention the swivel stems 62 and 64 are so connected to the driving sprocket 54 that the wheels 70 and 72 are either caused to swing in the swivel bearings 58 and 60 in synchronous steering movements with the front steering wheels 12 and, preferably, in parallelism thereto, or they are locked against steering movements but in parallelism to each other and in symmetrical relation to the front steering wheel swivel stem 10.

The means employed in the illustrative embodiment of the invention for effecting either a positive swivel stem turning connection between the front wheel swivel stem 10 and the rear wheel swivel stems 62 and 64 or for leaving the front wheel swivel stem free for turning while locking the rear stems against turning will now be described. It will be understood, however, that many of the elements employed in the connections here shown, which suit the invention to the particular application thereof illustrated, will be unnecessary in the application of the invention to trucks for other uses In the drawings, as hereinabove suggested, the invention is shown as embodied in a truck particularly designed for use in jockeying airplanes about aircraft carrier decks or hangar floors and also for moving airplanes about the plants in which they are built, equipped or repaired, such trucks being commonly known as spotting dollies. The spotting dolly illustrated in the drawings is of the type which effects the lifting of the under carriage of the airplane to facilitate moving the airplane about the deck by engaging the tire of one of the main wheels of the under carriage, two of the dollies being used in spotting each plane.

To facilitate moving the truck into position so that its lifting mechanism can engage the tires of one of the main wheels, the truck frame, as hereinabove pointed out, is preferably provided with an open rear end and, as herein shown, the side members of the truck frame or body 4 and 6 are preferably parallel. It will be understood, however, that the invention is not restricted to this particular arrangement of the side members nor is the invention restricted either to spotting dollies in general or to spotting dollies which effect the lifting of the main body of the plane by engagement with the tires of the main wheels of the under carriage.

In the type of spotting dolly illustrated the driving connections between the steering wheel swivel stem 10 and the swivel stems 62 and 64 may conveniently comprise the sprocket 54, which is connectable to and disconnectable from the swivel stem 10, as hereinafter more fully described, sprockets 74 and 76 on the swivel stems 62 and 64 and sprocket chain connections therebetween. As herein shown, because of the rectangular shape of the truck frame, it is desirable, in order to prevent interference of the sprocket chains with the lifting mechanism, to provide intermediate driven and driving sprockets between the driving sprocket 54 and the driven sprockets 74 and 76. As shown in the drawings, the sprocket chain 78 passes over upper sprockets 80 and 82 on vertical shafts 84 and 86 near the corners of the truck frame, the sprockets 80 and 82 being thus driven from the sprocket 54.

Connected to the lower ends of the shafts 84 and 86, and turning therewith, are intermediate driving sprockets 88 and 90, respectively connected by sprocket chains 92 and 94 to the sprockets 74 and 76 on the rear wheel swivel stems 62 and 64. It will be seen that these sprocket chain connections between the sprocket 54 on the front wheel swivel stem 10 and the sprockets 74 and 76 on the rear wheel swivel stems 62 and 64 are such that the rear wheels 70 and 72, when the sprocket 54 is connected to the swivel stem 10, will be turned in the same directions as the front wheels 12 by the swinging of the steering tongue 20.

As hereinabove pointed out, an important feature of the invention is the provision for connecting the steering wheel swivel sprocket 54 to the steering wheel swivel stem 10, when it is desired to effect synchronous steering of all of the wheels of the truck or dolly, and for so disconnecting the sprocket 54 from the swivel stem 10 that, as an incident of such disconnection, the rear wheels 70 and 72 will be locked against swiveling or castering movement and will be maintained in parallelism to each other and in symmetrical relation to the steering wheel swivel stem 10. As herein shown, a locking pin or bolt 96 is arranged to slide in a guideway 98, of corresponding cross section, in the sleeve 52 to which the sprocket 54 is connected. As shown, the pin 96 is preferably of circular cross section except that it is provided on its upper side with a fin or rib 100 traveling in a correspondingly shaped groove in the guide 98 to keep the pin or bolt 96 from turning in its guideway. A spring pressed ball 102 in a small socket 104 carried by the sleeve 52 presses upon the rib 100 of the pin or bolt 96 and prevents the pin from sliding too freely either into or out of its sprocket connecting relation to the swivel stem 10.

As hereinabove pointed out, the swivel stem 10 for the steering wheel is hollow and a brake rod 34 is arranged to slide vertically through the hollow interior. To permit vertical movement of the brake rod 34 over the pin or bolt 96 when the pin 96 is in its sprocket locking position in the guide 98, a vertically elongated opening 106 is provided in the brake rod 34. An opening 108 must, of course, also be provided in the swivel stem 10 to receive the pin or bolt 96 in order to effect the locking thereof to the sprocket carrying sleeve 52 when the parts are thus locked together. As shown in Figure 2 of the drawings, it will be seen that both the sprocket 54 and the brake rod 34 must turn with the swivel stem 10 when the pin 96 is in sprocket locking position. Of course the brake rod 34 ordinarily turns with the swivel stem 10 anyway.

Rigidly connected to the front part 2 of the truck frame or body is a U-shaped plate or stud 110 having therein a guide 112 constituting a keeper to receive the locking pin 96 when it is withdrawn from locking relation to the sleeve 52. The bolt guide or keeper 112 is so located in respect to the various paths of travel of the pin or bolt 96 that it will receive the pin or bolt 96 only when the parts are in the position shown in Figures 1 and 2, that is, with both the supporting and the steering wheels of the truck in parallelism and with the supporting wheels in symmetrical relation to the swivel stem 10. In other words, all of the truck supporting and steering wheels must be parallel to the axis of symmetry of the truck before the bolt 96 can be shot home in its keeper 112. Moreover the U- shaped plate 110, the curved part of which is concentric with the axis of the swivel stem 10, prevents withdrawal of the pin or bolt 96 from its swivel connecting position except when it is aligned with the guide or keeper 112.

It is important that, when the front wheels 12 only are used for steering, the rear wheels 70 and 72 be kept from free swiveling or castering movements. The locking pin or bolt 96 is, therefore, preferably so limited in its movement into the guide or keeper 112 that its front end will remain in locking relation to the sleeve 52 but out of locking relation to the swivel stem 10 and the brake-applying bolt 34. To insure this a combined stop and operating handle is provided. In the illustrative embodiment of the invention this stop comprises a block 114 having attached thereto a knobbed handle 116 to be grasped by the operator who moves the locking pin or bolt 96 into its different locking positions, the block 114 being secured by a set screw 118, which may be the handle rod, to the bolt in such a position thereon, as shown in Figures 2 and 3, that, in its forward movement, the bolt will project into the guideway 98 in the sleeve 52 a sufficient distance to lock the swivel stem 10 and the sleeve together on both sides of the swivel stem 10 and that when pushed back into the position shown in Figure 3 it will lock the sprocket wheel 54 to the keeper 12 but will not interfere with the swiveling movement of the swivel stem 10 or of the brake bolt 34 which turns therewith.

As above suggested, the illustrative embodiment of the invention is in a spotting dolly in which the lifting mechanism engages a tire of one of the main wheels of the airplane under-carriage to effect the lifting of the wheel from the supporting surface. As herein shown, the lifting mechanism is of the hydraulic type and comprises a hydraulic ram or plunger 120 working in a hydraulic cylinder 122 supplied by a pump 124 having an operating handle 126 within convenient reach of the operator. A release lever 128, for effecting the discharge of the hydraulic liquid back into the storage reservoir 130 when it is desired to lower the lifting mechanism, is also arranged within convenient reach of the operator of the truck.

The hydraulic ram carries at its upper end a cross frame member 132, which may be of any suitable section such as an I section or a channel section, this cross member constituting part of a lifting frame carrying the tire engaging shoes 134 and 136 which are fulcrumed at 140 and 142 on arms 144 and 146 projecting rearwardly from vertical laterally adjustable bars 145 and 147. The vertical bars 145 and 147 are adjustable laterally in the lifting frame to accommodate tires of different diameters. At their lower ends the bars 145 and 147 are guided and supported by sleeves 148 and 150 which are mounted upon a guide rod or shaft 152 carried at its ends in ears 154 attached to the side members 156 and 158 of the vertically slidable lifting frame of which the crossbar 132 constitutes the top member. The lifting frame is preferably also provided with a bottom crossbar 160. At its upper end the lifting frame is also provided with a second guide rod 162 for the adjustable shoe supporting vertical bars 145 and 147. The rod 162 is also supported in ears 164, similar to the ears 154, carried by the side members 156 and 158, respectively, of the lifting frame. Sleeves 166 and 168 carried by the upper ends of the laterally adjustable bars 145 and 147 serve to keep said bars 145 and 147 in vertical parallelism throughout their lateral movements. Braces 170 and 171 of sheet steel respectively welded to the bar 145 and the sleeves 148 and 166 and to the bar 147 and sleeves 150 and 168 not only serve to maintain all of the parts in parallelism throughout the lateral adjusting movements, but act to resist any tendency to distortion when the weight of the airplane is carried by the lifting mechanism.

To effect the movements of the tire engaging shoes 134 and 136 toward or away from each other to suit them to tires of different diameters, adjusting shaft 172 may be provided with right hand and left hand threads so that, when threaded through correspondingly tapped openings in the bars 145 and 147, turning of the shaft 172 in one direction will cause the bars 145 and 147 to move toward each other and turning of the shaft in the other direction will cause them to move away from each other. To effect this tire accommodating adjustment the shaft 172, which is preferably mounted near its end in bearings 174 carried upon the side members 156 and 158 of the lifting frame, may be provided with a crank pin 176 at each end to receive the slotted socket of a removable crank 178 by which the shaft may be cranked from either end to effect the tire accommodating adjustment. The crank 178 when not in use may be kept upon any suitable support on the front of the lifting mechanism within convenient reach of the operator, as shown in Figure 1 of the drawings.

To guide the lifting frame in its lifting movements, vertical guides 180 and 182 are mounted upon the side body members 4 and 6 and braced thereon as shown. The guides 180 and 182 are connected at their top by a crossbar 184. The arms 144 and 146 at or near the ends of which the shoes 134 and 136 are carried are preferably provided with braces 186 connecting them to the bars 145 and 147. Proper guiding of the lifting frame in its vertical lifting movements will obviously require that the upper guide rollers 188 for the lifting frame bear against the front sides of the guides 180 and 182 and that the lower guide rollers 190 bear against the rear sides of the guides 180 and 182.

From the foregoing description of the invention in its application to airplane spotting dollies of the type which effect the lifting of the plane by engagement with the tires of the main wheels of the under-carriage, the advantages of the invention will be obvious. Ordinarily, in jockeying the dolly into position to effect the lifting of one side of the airplane under-carriage before spotting the plane, there will be no advantage in having the swivels 62 and 64 connected to the swivel 10 for synchronous steering. In fact there would probably be some disadvantage. When, however, the two dollies required for spotting a single airplane have each been brought into tire-engaging relation to its under-carriage main wheel and the airplane has had its two main wheels lifted from the deck or floor preparatory to the spotting movement, it will then usually be found advantageous to connect the swivels of the three wheels for synchronous steering especially if the movement is into or out of a crowded storage space. This can readily be done in the manner hereinabove described and the disconnection can as readily and quickly be made, the only condition precedent to the disconnection as well as to the connection being that the wheels be in the position shown in Figures 1 and 2 so that the movement of the bolt or pin 96 into or out of its locking position can properly be effected.

Although the invention is herein shown as embodied in a truck of the three wheel type, that is one having a single swiveled steering wheel bearing support at the front, it will be understood that it is not intended to restrict the invention to this type of truck and that the claims should be given the broadest construction possible in view of the state of the art.

The invention has also been described primarily in its application to synchronous steering connections which effect turning of all of the swivels in the same direction. Although this is the preferable arrangement, particularly in airplane spotting dollies, there may be occasions when it is desirable to provide for turning sharp corners by synchronous steering. In Figures 5 and 6 have been shown slight modifications of the construction making possible both synchronous steering in which the swivels all turn in the same direction and synchronous steering in which the rear swivels turn in directions opposite to those in which the front swivel turns.

In Figure 5 the rear span of the chain 78, instead of running straight across between the sprockets 80 and 82, is guided between idlers 192 and 194 mounted on a slide 196 by which the idlers 192 and 194 may be caused to bring the rear span into driving engagement with the sprocket 54 while idlers 198 on the same slide move the front span of the chain 78 out of engagement with the sprocket 54. As shown in dotted lines in Figures 5 and 6 the slide 196 is provided with a slot 204 which permits its movement relative to the parts beneath the sprocket wheel 54 and particularly relative to the vertical bearing 8 for the swivel stem 10, such relative movement being necessary to effect the movements of the sprocket chain 78 from the position in which it engages the front of the sprocket wheel to the position in which it engages the rear of the sprocket wheel.

In Figure 6, which shows a truck in which a single chain 200 only is needed to connect the swivels for synchronous steering, a shunt chain 202 could be substituted for the rear span of Figure 5 to bring about the two kinds of steering by movement of the slide 196 into its forward or its rearward position.

What is claimed as new is:

1. A truck comprising, in combination, a frame, a front steering wheel and rear supporting wheels, each of said wheels having a bearing support swiveled in the frame to permit steering movements thereof, a steering and draft tongue having a direct steering connection to the front wheel bearing support for independent steering movement thereof, means directly connectable to and disconnectable from the front wheel swivel for effecting, when desired, a positive swivel turning connection between said rear wheel swivels and said front wheel swivel or for leaving said front wheel swivel free for independent steering movement, respectively, said means being connectable or disconnectable only when the steering and supporting wheels are in predetermined angular relations to each other, and means, including said positive swivel turning connection, for positively locking the rear wheel swivels against swiveling movement whenever said swivel turning connection therefrom to the front wheel swivel is disconnected.

2. A truck according to claim 1 in which the locking means are so arranged in respect to said means for effecting said swivel turning connection as to prevent connection to and disconnection from said front wheel swivel except when said rear wheels are in symmetrical relation to the front wheel swivel.

3. A truck according to claim 1 in which the locking means are so arranged in respect to said means for effecting said swivel turning connection as to prevent connection to and disconnection from said front wheel swivel except when said rear wheels are in symmetrical relation to the front wheel swivel and the front steering wheel is also parallel to the said rear wheels.

4. A truck according to claim 1 having sprockets on the wheel bearing support swivels and sprocket chain connections therebetween, the steering wheel swivel sprocket being connectable to and disconnectable from said steering wheel swivel and connectable to and disconnectable from said frame to lock said rear wheel swivels against turning movement.

5. A truck according to claim 1 in which the frame comprises spaced side members providing an open load embracing rear end, and each supported near its rear end by one of the rear supporting wheels, the steering connections to said rear wheel swivels extending along said spaced side members and being also so arranged as to leave an open load embracing rear end.

6. A truck according to claim 1 having its frame comprised of spaced side bars providing an open load embracing rear end and in which the positive swivel turning connections between the front and rear wheel swivels comprise a sprocket connectable to and disconnectable from the front wheel swivel, upper and lower transmission sprockets upon the front end of each side bar, a sprocket upon each rear wheel swivel, a sprocket chain connecting said front sprocket to one of the sprockets of each of said pairs of upper and lower transmission sprockets and separate sprocket chains extending along said side bars and connecting the other sprockets of said pairs respectively to the rear sheel swivel sprockets.

7. A truck according to claim 1 in which said locking means comprises means movable from a position in which it connects said positive swivel turning connection to the front wheel swivel into a position in which it releases said swivel turning connection from said front wheel swivel and locks it to the truck frame and vice versa.

8. A truck comprising, in combination, a frame and supporting wheels, each of which has a bearing support swiveled in the frame to permit steering movements thereof, a steering tongue connected to the bearing support of one of said wheels to effect positive steering movements thereof, sprocket and chain connections between said swivels for effecting synchronous steering movements thereof, said steering wheel swivel sprocket being connectable to and disconnectable therefrom, means for positively connecting said steering wheel sprocket to said steering wheel swivel to insure synchronous movement of all swivels and means for positively connecting said sprocket, when disconnected from said steering wheel swivel, to said frame to lock the remaining swivels against steering movement while permitting free steering movement of said steering wheel swivel.

9. A truck according to claim 1 in which said locking means are so constructed as to prevent unlocking of said steering wheel swivel sprocket from said steering wheel swivel without its locking to the frame.

10. A truck comprising, in combination, a frame, a front steering wheel and rear supporting wheels, each of said wheels having a bearing support swivelled in the frame to permit steering movements thereof, a steering tongue having a steering connection to the front wheel bearing support for independent steering movement thereof, and means directly connectable to and disconnectable from the front wheel swivel for effecting, when desired, a positive swivel turning connection between said rear wheel swivels and said front wheel swivel, said swivel turning connection comprising sprockets on the respective swivels and a sprocket chain so connected thereto as to produce synchronous steering movements of the rear wheels in parallelism to each other but in rotary directions about the axes of their swivel bearings the reverse of those of the front wheel.

11. A truck comprising, in combination, a frame, a front steering wheel and rear supporting wheels, each of said wheels having a bearing support swivelled in the frame to permit steering movements thereof, a steering tongue having a steering connection to the front wheel bearing support for independent steering movement thereof, and means directly connectable to and disconnectable from the front wheel swivel for effecting, when desired, a positive swivel turning connection between said rear wheel swivels and said front wheel swivel, said positive swivel connection comprising sprockets on the respective bearing support swivels and sprocket chain connections therebetween, the steering wheel sprocket being connectable to and disconnectable from said steering wheel swivel and the sprocket chain driven from said steering wheel swivel comprising front and rear spans which may be brought alternatively into driving engagement therewith, and means for bringing either the front or the rear span into driving engagement with said steering wheel sprocket according as it is desired to produce synchronous steering movements of the rear supporting wheels in parallelism with the front steering wheel or synchronous steering movements of the rear supporting wheels in parallelism with each other but in rotary directions about the swivel axes the reverse of those of the steering wheel.

12. A truck according to claim 11 in which a single sprocket chain having a shunt span effects the connection between the steering and the supporting wheel swivel sprockets, said shunt span being so located that it may be brought into engagement with the steering wheel sprocket when synchronous turning of the rear wheels in parallelism with each other but not in parallelism with the steering wheel is desired, means being provided for simultaneously moving said shunt span into and said front span out of engagement with said steering wheel sprocket and vice versa.

WILLIAM C. HOUSE.